US008080171B2

(12) United States Patent
Lee et al.

(10) Patent No.: US 8,080,171 B2
(45) Date of Patent: Dec. 20, 2011

(54) WET-LAID CHOPPED STRAND FIBER MAT FOR ROOFING MAT

(75) Inventors: Jerry H. C. Lee, Columbus, OH (US);
Dennis R. Brown, Anderson, SC (US);
Timothy A. Miller, Newark, OH (US);
Timothy R. Gilbert, Granville, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 402 days.

(21) Appl. No.: 11/809,501

(22) Filed: Jun. 1, 2007

(65) Prior Publication Data

US 2008/0299852 A1  Dec. 4, 2008

(51) Int. Cl.
*C03C 25/24* (2006.01)

(52) U.S. Cl. ........ 252/8.83; 525/102; 525/431; 8/115.6; 65/448

(58) Field of Classification Search ................ 252/8.83; 65/448; 525/102, 431; 8/115.6
See application file for complete search history.

(56) References Cited

U.S. PATENT DOCUMENTS

| 4,147,833 A | 4/1979 | Eilerman et al. |
| 4,178,203 A | 12/1979 | Chakrabarti |
| 4,190,566 A | 2/1980 | Noll et al. |
| 4,255,485 A | 3/1981 | Yau |
| 4,258,098 A | 3/1981 | Bondoc |
| 4,271,229 A * | 6/1981 | Temple ............. 442/108 |
| 4,359,546 A | 11/1982 | Bershas |
| 4,394,475 A * | 7/1983 | Temple et al. ............. 524/262 |
| 4,461,804 A | 7/1984 | Motsinger et al. |
| 4,526,914 A | 7/1985 | Dolin |
| 4,536,446 A | 8/1985 | Hsu et al. |
| 4,542,065 A | 9/1985 | Gaa |
| 4,542,068 A | 9/1985 | Whichard |
| 4,546,880 A * | 10/1985 | Reese ............. 206/410 |
| 4,567,228 A | 1/1986 | Gaa et al. |
| 4,582,873 A | 4/1986 | Gaa et al. |
| 4,592,956 A | 6/1986 | Gaa et al. |
| 4,681,658 A | 7/1987 | Hsu et al. |
| 4,681,802 A | 7/1987 | Gaa et al. |
| 4,745,028 A | 5/1988 | Das et al. |
| 4,762,750 A | 8/1988 | Girgis et al. |
| 4,795,678 A * | 1/1989 | Girgis ............. 428/391 |
| 4,810,576 A * | 3/1989 | Gaa et al. ............. 428/391 |
| 5,041,494 A | 8/1991 | Franke et al. |
| 5,554,686 A | 9/1996 | Frisch, Jr. et al. |
| 5,646,207 A * | 7/1997 | Schell ............. 524/47 |
| 5,667,058 A * | 9/1997 | Bonnet ............. 198/831 |
| 5,773,146 A | 6/1998 | Lawton et al. |
| 5,804,313 A | 9/1998 | Schell |
| 5,851,933 A | 12/1998 | Swartz |
| 6,034,006 A | 3/2000 | Arpin et al. |
| 6,179,962 B1 | 1/2001 | Brady |
| 6,228,281 B1 * | 5/2001 | Sage ............. 252/8.83 |
| 6,384,116 B1 | 5/2002 | Chan et al. |
| 6,544,911 B2 | 4/2003 | Peng et al. |
| 6,642,299 B2 | 11/2003 | Wertz |
| 6,706,147 B2 | 3/2004 | Peng et al. |
| 6,770,169 B1 | 8/2004 | Wallace |
| 6,817,152 B2 | 11/2004 | Peng et al. |
| 6,864,340 B2 | 3/2005 | Levandoski et al. |
| 7,927,459 B2 | 4/2011 | Huang et al. |
| 2002/0144522 A1 | 10/2002 | Messick et al. |
| 2002/0198301 A1 * | 12/2002 | Campbell et al. ............. 524/300 |
| 2005/0136237 A1 | 6/2005 | Beerda et al. |
| 2005/0276960 A1 | 12/2005 | Lee et al. |
| 2005/0282451 A1 | 12/2005 | Canfield et al. |
| 2006/0113050 A1 | 6/2006 | Droux et al. |
| 2006/0204737 A1 | 9/2006 | Ziegler |
| 2007/0006775 A1 | 1/2007 | Helwig et al. |
| 2007/0039703 A1 | 2/2007 | Lee et al. |
| 2007/0059506 A1 | 3/2007 | Hager et al. |
| 2009/0071617 A1 | 3/2009 | Huang et al. |

FOREIGN PATENT DOCUMENTS

| EP | 1584724 | 10/2005 |
| FR | 2250719 | 5/1975 |
| WO | 94/13473 | * 6/1994 |
| WO | WO 98/34885 | 8/1998 |
| WO | WO 2007/024683 | 3/2007 |
| WO | 2008/150944 | 12/2008 |
| WO | 2010/036256 | 4/2010 |

* cited by examiner

OTHER PUBLICATIONS

Subramani et al. "Synthesis and Characterization of Water-borne Crosslinked Silyated Polyurethane Dispersions" Journal of Applied Polymer Science, Jul. 26, 2005, pp. 620-631, vol. 98, Issue 2, Wiley Periodicals, Inc.
Subramani et al. "Synthesis and Characterization of Silyated Polyurethane from Methyle Ethyl Ketoxime-Blocked Polyurethane Dispersion" Feb. 11, 2004.

(Continued)

*Primary Examiner* — Margaret G Moore
(74) *Attorney, Agent, or Firm* — Calfee, Halter & Griswold LLP

(57) ABSTRACT

A sizing composition for reinforcement fibers that includes one or more film forming agents, a silane coupling agent package, and at least one lubricant surfactant is provided. Optional components such as rheology modifiers, fillers, biocides, and pH modifiers may also be included. Preferred film forming polymers are amide-based polymers. Additionally, the sizing composition is free of polyvinyl alcohol. The absence of polyvinyl alcohol in the size composition reduces or eliminates the production of precipitates from white water in wet-laid processes. The size composition is applied to reinforcement fibers and formed into chopped strand, wet-laid mats that can be used for a variety of purposes, including roofing products. Chopped strand mats formed from fibers sized with the inventive sizing composition maintains or improves the dry tear and tensile strengths compared to chopped strand mats made from fibers sized with a commercial sizing composition that does not contain polyvinyl alcohol.

18 Claims, No Drawings

WET-LAID CHOPPED STRAND FIBER MAT FOR ROOFING MAT

TECHNICAL FIELD AND INDUSTRIAL APPLICABILITY OF THE INVENTION

The present invention relates generally to a sizing composition for glass fibers, and more particularly, to a sizing composition for reinforcement fibers that is free of polyvinyl alcohol. A roofing mat formed from a reinforcing fiber material sized with the sizing composition is also provided.

BACKGROUND OF THE INVENTION

Typically, glass fibers are formed by drawing molten glass into filaments through a bushing or orifice plate and applying an aqueous sizing composition containing lubricants, coupling agents, and film-forming binder resins to the filaments. The sizing composition provides protection to the fibers from interfilament abrasion and promotes compatibility between the glass fibers and the matrix in which the glass fibers are to be used. After the sizing composition is applied, the fibers may be gathered into one or more strands and wound into a package or chopped while wet and collected. The collected continuous strands or chopped strands can then be dried or the chopped strands may be packaged in their wet condition as wet chopped fiber strands (WUCS). The chopped strands may contain hundreds or thousands of individual glass fibers. The steps taken in conjunction with the fibers depend upon the ultimate use of the glass fibers.

Wet chopped fibers are conventionally used in wet-laid processes in which the wet chopped fibers are dispersed in a water slurry that contains surfactants, viscosity modifiers, defoaming agents, and/or other chemical agents. The slurry containing the chopped fibers is then agitated so that the fibers become dispersed throughout the slurry. The slurry containing the fibers is deposited onto a moving screen where a substantial portion of the water is removed to form a web. A binder is then applied, and the resulting mat is dried to remove any remaining water and cure the binder. The formed non-woven mat is an assembly of dispersed, individual glass filaments.

The sizing composition applied to wet chopped fibers used in wet-laid processes to form non-woven mats generally contains polyvinyl alcohol as the film forming agent. The polyvinyl alcohol functions as a processing aid and protects the glass fibers from breaking during the formation of the fibers. However, once the fibers are chopped and placed into the white water, the polyvinyl alcohol tends to wash off the fibers into the white water. In the white water, the polyvinyl alcohol precipitates out of solution. This precipitate can be detrimental to the manufacturing line in that the precipitate can clog the tanks. In such a situation, the manufacturing line must be stopped to clean the tanks and remove the precipitate. Additionally, the polyvinyl alcohol can cause storage problems, particularly in warm environments. As water evaporates from the sizing composition, the polyvinyl alcohol tends to form a film covering the surface of the aqueous composition within the storage container. Further, the large number of hydroxyl groups present in the polyvinyl alcohol encourages undesirable microbe activity in the storage containers.

Sizing compositions that do not contain polyvinyl alcohol for fibers used in a wet-laid process currently exist in the art. Non-limiting examples of such polyvinyl alcohol-free sizing compositions are set forth below.

U.S. Pat. No. 4,461,804 to Motsinger, et al. discloses an aqueous sizing composition that includes a cationic lubricant, an amide compound, and a water soluble or dispersible polyol. The sizing composition is used to produce wet chopped size glass fiber strands that are subsequently used to form non-woven glass fiber mats by a wet-laid process. The water dispersible or water soluble polyols comprise a major amount of the solids of the sizing composition. The cationic lubricant forms a minor amount of the solids. Optionally, one or more silane coupling agents may be included in the size composition.

U.S. Pat. Nos. 4,592,956 and 4,681,802 to Gaa, et al. teach a treating composition that includes (1) one or more soluble, dispersible, and/or emulsifiable cationic lubricants having one or more primary, secondary, and/or tertiary amines, (2) one or more water soluble poly(oxyethylene-oxyalkylene) copolymers having a molecular weight of at least 15,000 and a weight ratio of ethylene oxide to hydrophobic alkylene oxide in the range from about 99 to 1, (3) one or more coupling agents having an organic and an inorganic polar functional moiety, and (4) water. The treating composition also preferably includes one or more starches that are less than completely soluble in cold water. The treating composition can be applied to any type of glass fiber and used in a wet-laid process.

U.S. Pat. No. 4,681,658 to Hsu, et al. discloses glass fibers treated with a composition that includes a nonionic surfactant and a cationic quaternary ammonium salt surfactant. The composition may be added simultaneously or sequentially with chopped fibers to an aqueous media (white water). Alternatively, the treating composition may be applied to glass fibers, which may then be formed into wet or dry chopped glass fibers. When the composition is used to treat glass fibers, a carrier such as water is added to the composition. One or more moderately water soluble, water dispersible, or water emulsifiable polyols such a polyvinyl alcohol may optionally be included in the composition. The treated glass fibers are used to form non-woven, sheet-like mats by any known method, including a wet-laid process. The glass fiber mats may be used as a replacement for felt in shingles or for use in built-up roofing systems.

U.S. Pat. No. 4,810,576 to Gaa, et al. teaches an aqueous chemical treatment for glass fibers that contains (1) an ungelled polymer that is capable of forming a film at a temperature below ambient temperature and has a molecular weight of at least 100,000 and up to 6,000,000, (2) one or more aldehyde-condensate reactable polymeric agents, (3) an aldehyde-condensate reactable organosilane coupling agent, (4) one or more water soluble, dispersible or emulsifiable cationic lubricant surfactants having one or more primary, secondary, and/or tertiary amine moieties, and (5) a carrier. The treating composition can be prepared by any method known in the art and applied to glass fibers by conventional methods. The treated glass fibers may be used to form a non-woven, sheet-like mat of treated chopped glass fibers by a wet-laid process.

U.S. Patent Publication 2007/0059506 to Hager, et al. discloses a sizing composition that includes one or more film forming agents (such as a polyurethane film former, a polyester film former, and/or an epoxy resin film former), at least one lubricant, and at least one silane coupling agent (such as an aminosilane or methacryloxy silane coupling agent). When needed, a weak acid such as acetic acid, boric acid, metaboric acid, succinic acid, citric acid, formic acid, and/or polyacrylic acid may be added to the size composition to assist in the hydrolysis of the silane coupling agent. The sizing composition maintains bundle integrity during the formation and subsequent processing of glass fiber bundles in a wet-laid process to form a chopped strand mat.

Although sizing compositions that do not contain polyvinyl alcohol for use with fibers used in wet-laid processes are known in the art, there remains a need in the art for a sizing composition for wet chopped fibers used in a wet-laid process that reduces or eliminates the formation of precipitates in the white water and maintains or exceeds the dry tensile and tear strengths of wet-laid mats formed with the sized fibers.

SUMMARY OF THE INVENTION

It is an object of the present invention to provide a sizing composition for reinforcement fibers that are used to form wet-laid, chopped strand mats. In preferred embodiments, the reinforcement fibers are glass fibers. The sizing composition includes one or more film forming agents, a silane coupling agent package, and at least one lubricating surfactant. Optional components such as rheology modifiers, fillers, biocides, and pH modifiers may also be included in the composition. In addition, the size composition is free of polyvinyl alcohol. The film forming agent may be a polyvinyl amine, a polyvinyl amine copolymer, a polyamide, a polyacrylamide, and/or a polyacrylamide copolymer. The silane coupling agent package includes two or more silane coupling agents. Preferably, the silane coupling agent package includes an amino silane and a ureido silane. Even more desirably, the amino silane contains one or more aromatic amines. Preferred film forming polymers come from the family of amide resins. The bond of the polyamide resin to the reinforcement fiber carries the polyamide through the white water and into the non-woven mat. As a result, the polyamide resin is not washed off in white water and may actively participate in the formation of a non-woven mat. Desirably, the viscosity of 20% of the polyamide in solution is preferably from 75-150 cp.

It is another object of the present invention to provide a reinforcing fiber for use in forming a non-woven, chopped strand mat. The fiber may be a glass fiber, a synthetic fiber, a carbon fiber, a polyaramide fiber, or a natural fiber. Preferably, the fiber is a glass fiber. The fiber is at least partially coated with a sizing composition that includes at least one film forming agent, a silane coupling agent package, and one or more lubricating surfactants. The film forming agent may be a polyvinyl amine, a polyvinyl amine copolymer, a polyamide, a polyacrylamide, a polyacrylamide copolymer, and combinations thereof. The coupling agent package may include an amino silane and a ureido silane. The amino silane desirably contains at least one aromatic amine. Optional components such as rheology modifiers, fillers, biocides, and pH modifiers may also be included in the composition. In addition, the size composition is free of polyvinyl alcohol.

It is yet another object of the present invention to provide a roofing mat formed of a plurality of randomly oriented, enmeshed reinforcement fibers. Preferably, the fibers are glass fibers. The fibers are at least partially coated with a sizing composition that includes at least one film forming agent, a silane coupling agent package that includes an amino silane and a ureido silane, and one or more lubricating surfactants. The film forming agent may be a polyvinyl amine, a polyvinyl amine copolymer, a polyamide, a polyacrylamide, a polyacrylamide copolymer, and combinations thereof. In preferred embodiments, the amino silane contains one or more aromatic amines. A roofing mat may be formed by a wet-laid process in which chopped fibers are dispersed in white water and formed into a mat. A binder is applied to a top surface of the mat and cured to form the roofing mat. Asphalt may at least partially coat the bottom surface of the mat. To form a roofing shingle, the asphalt-coated mat may be cut into a desired shape.

It is an advantage of the present invention that chopped strand mats formed from fibers sized with the inventive sizing composition maintain or exceed dry tear and tensile strengths compared to chopped strand mats made from fibers sized with a commercial sizing composition that does not contain polyvinyl alcohol.

It is another advantage of the present invention that there is little or no formation of precipitates in the white water tank.

It is yet another advantage of the present invention that manufacturing time for forming chopped strand glass mats is increased due to the lack of precipitate formation.

It is a feature of the present invention that the sizing composition is free of polyvinyl alcohol.

It is another feature of the present invention that the silane coupling package includes an amino silane and a ureido silane.

It is yet another feature of the present invention that the polyamide resin in the size composition may function as a catalyst to catalyze binder curing during the formation of a non-woven chopped strand mat by a wet-laid process.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

The terms "film forming agent" and "film former" may be used interchangeably herein. In addition, the terms "reinforcing fiber material" and "reinforcing fiber" may be used interchangeably herein. Additionally, the terms "size", "sizing composition", and "size composition" may be interchangeably used.

The present invention relates to a sizing composition for reinforcement fibers. The size composition includes one or more film forming agents, a silane coupling agent package, and at least one lubricating surfactant. Optional components such as rheology modifiers, fillers, biocides, and pH modifiers may also be included. In addition, the size composition is free of polyvinyl alcohol. The absence of polyvinyl alcohol in the size composition reduces or eliminates the production of precipitates (e.g., sludge) from white water in a wet-laid process. Reducing the amount of sludge in the white water leads to an increase in manufacturing time in forming chopped strand mats because the mat production line does not have to be frequently shut down to clean the tanks. The size composition is applied to reinforcement fibers and formed into chopped strand, wet-laid mats that can be used for a variety of purposes, including roofing products such as shingles. Chopped strand mats formed from fibers sized with the inventive sizing composition maintain or exceed the dry tear and tensile strengths compared to chopped strand mats made from fibers sized with commercial sizing compositions that do not contain polyvinyl alcohol.

The sizing composition includes a film former or a combination of film formers. Film formers are agents which create improved adhesion between the reinforcing fibers, which results in improved strand integrity. In the inventive size composition, the film forming agent acts as a polymeric binding agent to provide additional protection to the reinforcing fibers and improve processability, such as a reduction in fuzz generated by high speed chopping. The film forming polymer component of the sizing composition may be any suitable polymer that can be dispersed or dissolved into an aqueous medium and which will coalesce to form a film when the sizing composition is dried. In addition, the film former is desirably chosen to have compatibility with the matrix resin in which the sized reinforcement fibers will be used.

Suitable polymeric resins for use in the sizing composition include, but are not limited to, amide based polymers, acrylic based polymers, polyester emulsions, vinylacetate emulsions, epoxy emulsions, and phenolic based polymers. Specific examples of polymers that may be used in the glass fiber based composition include polyvinyl amine, polyvinyl amine copolymers, polyvinyl chloride (PVC), chlorinated polyvinyl chloride (CPVC), polyethylene, polypropylene, polycarbonates, polystyrene, styreneacrylonitrile, acrylonitrile butadiene styrene, acrylic/styrene/acrylonitrile block terpolymer (ASA), polysulfone, polyurethane, polyphenylenesulfide, acetal resins, polyamides, polyacrylamides, polyacrylamide copolymers, polyaramides, polyimides, polyesters, polyester elastomers, acrylic acid esters, copolymers of ethylene and propylene, copolymers of styrene and butadiene, copolymers of vinylacetate and ethylene, and combinations thereof. In addition, the polymeric resin may be post industrial or consumer grade (regrind). The polymeric resins may be present in the size composition in an amount from about 5.0% to about 30.0% by weight of the composition, preferably from about 10.0% to about 20.0% by weight of the composition.

Preferred film forming polymers come from the family of amide resins. Amide resins are adducts of fatty acids (e.g., stearic acid, linoleic acid, tallow, and canola oil) and polyamines (e.g., diethylene triamine, triethylene tetramine, and tetraethylene pentamine). Once the polyamide resin is neutralized with an acid, the neutralized polyamide resin adheres to the reinforcement fibers through ionic bonding. The bond of the polyamide resin to the reinforcement fiber (e.g., glass fiber) carries the polyamide through the white water and into the non-woven mat. Thus, the polyamide resin is not washed off in the white water and may actively participate in the formation of the non-woven mat. For example, the polyamide resin may function as a catalyst to catalyze the binder curing during the formation of a non-woven chopped strand mat in a wet-laid process. Desirably, the viscosity of 20% of the polyamide in solution is 10-1000 cp, preferably from 20-500 cp, and most preferably from 75-150 cp.

As discussed above, the size composition also includes a silane coupling agent package containing two or more silane coupling agents. The silane coupling agents may be present in the sizing composition in an amount from about 1.0 to about 40.0% by weight of the total composition, preferably from about 10 to about 30% by weight of the total composition, and most preferably from about 5 to about 15% by weight of the total composition. Besides their role of coupling the surface of the reinforcement fibers and the plastic matrix, silanes also function to enhance the adhesion of the polycarboxylic acid component to the reinforcement fibers and to reduce the level of fuzz, or broken fiber filaments, during subsequent processing. Examples of silane coupling agents that may be used in the size composition may be characterized by the functional groups amino, epoxy, vinyl, methacryloxy, ureido, isocyanato, and azamido. In preferred embodiments, the silane coupling agents include silanes containing one or more nitrogen atoms that have one or more functional groups such as amine (primary, secondary, tertiary, and quaternary), amino, imino, amido, imido, ureido, isocyanato, or azamido.

Suitable silane coupling agents include, but are not limited to, amino silanes, silane esters, vinyl silanes, methacryloxy silanes, epoxy silanes, sulfur silanes, ureido silanes, and isocyanato silanes. Specific non-limiting examples of silane coupling agents for use in the instant invention include γ-aminopropyltriethoxysilane (A-1100), n-phenyl-γ-aminopropyl-trimethoxysilane (Y-9669), n-trimethoxy-silyl-propyl-ethylene-diamine (A-1120), methyl-trichlorosilane (A-154), γ-chloropropyl-trimethoxy-silane (A-143), vinyl-triacetoxy silane (A-188), methyltrimethoxysilane (A-1630), γ-ureidopropyltrimethoxysilane (A-1524), and vinyl aminosilanes (e.g., Z-6032 and Z-6224 available from Dow Corning). Other examples of suitable silane coupling agents are set forth in Table 1. All of the silane coupling agents identified above and in Table 1 except for Z-6032 and Z-6224 are available commercially from GE Silicones.

TABLE 1

| Silanes | Label |
|---|---|
| Silane Esters | |
| octyltriethoxysilane | A-137 |
| methyltriethoxysilane | A-162 |
| methyltrimethoxysilane | A-163 |
| Vinyl Silanes | |
| vinyltriethoxysilane | A-151 |
| vinyltrimethoxysilane | A-171 |
| vinyl-tris-(2-methoxyethoxy) silane | A-172 |
| Methacryloxy Silanes | |
| γ-methacryloxypropyl-trimethoxysilane | A-174 |
| Epoxy Silanes | |
| β-(3,4-epoxycyclohexyl)-ethyltrimethoxysilane | A-186 |
| Sulfur Silanes | |
| γ-mercaptopropyltrimethoxysilane | A-189 |
| Amino Silanes | |
| γ-aminopropyltriethoxysilane | A-1101 |
|  | A-1102 |
| aminoalkyl silicone | A-1106 |
| γ-aminopropyltrimethoxysilane | A-1110 |
| triaminofunctional silane | A-1130 |
| bis-(γ-trimethoxysilylpropyl)amine | A-1170 |
| polyazamide silylated silane | A-1387 |
| Ureido Silanes | |
| γ-ureidopropyltrialkoxysilane | A-1160 |
| γ-ureidopropyltrimethoxysilane | Y-11542 |
| Isocyanato Silanes | |
| γ-isocyanatopropyltriethoxysilane | A-1310 |

In preferred embodiments, the silane coupling agent package includes an amino silane and a ureido silane. Even more desirably, the amino silane contains one or more aromatic amines. The presence of aromatic amines on the silane coupling agent assists in bonding the reinforcement fiber (e.g., glass fibers) to the film forming resin. In addition, the aromatic amines interact with the asphalt and further function as a compatabilizer between the chopped strand mat and the asphalt in roofing applications. It is believed that the combination of the amino silane and the ureido silane causes dry tear and tensile strengths of chopped strand mats formed from fibers sized with the inventive sizing composition that are equivalent to or superior than existing chopped strand mats formed from fibers sized with conventional sizing compositions.

In addition, the size composition includes at least one lubricating surfactant that is water soluble, dispersible, or emulsifiable to facilitate fiber manufacturing, processing, and fabrication. The lubricating surfactant(s) may be present in the size composition in an amount from about 2.0 to about 80.0% by weight of the total composition, preferably from about 40.0 to about 80.0% by weight of the total composition, and more preferably about 50.0 to about 75.0% by weight of the total composition. When two or more lubricating surfactants are present in the sizing composition, each lubricating surfactant may be added in an amount from about 1.0 to about 40% by weight of the total composition, preferably in an amount from about 10.0 to about 25.0% by weight. Non-exclusive examples of lubricating surfactants for use in the sizing composition include polyoxamines (e.g., an ethylene oxide/propylene oxide block polymer (e.g., Tetronic® 908, commercially available from BASF Corporation)), stearic ethanolamide (Lubesize K-12, commercially available from AOC, LLC), polyethylene glycol esters, ethoxylated castor oil esters, aliphatic mono-, di-, and poly-amines (e.g., N-alkyl trimethylenediamine, 2-alkyl-2-imidazoline and 1-(2-aminoethyl)-2-alkyl-2-imidazoline), amine ethoxylates (Alkaminox T-12 and Katapol PN-430, commercially available from Rhodia), and cationic fatty amides (Emory 7484 and Emory 6717, commercially available from Cognis).

The size composition further includes water to dissolve or disperse the active solids for application onto the reinforcement fibers. Water may be added in an amount sufficient to dilute the aqueous sizing composition to a viscosity that is suitable for its application to the reinforcement fibers and to achieve a desired solids content on the fibers. In particular, the size composition may contain up to about 99.5% by weight of the total composition of water.

In addition, the size composition may optionally include a pH adjusting agent in an amount sufficient to adjust the pH to a desired level. Suitable pH adjusting agents include weak organic acids such as acetic acid, citric acid, sulfuric acid, or phosphoric acid or a base such as ammonia or sodium hydroxide. The pH may be adjusted depending on the intended application, or to facilitate the compatibility of the ingredients of the size composition. Preferably, the sizing composition has a pH from 3-7, and more preferably a pH from 5-6.

Further, the size composition may optionally contain conventional additives such as rheology modifiers, fillers, coalescents such as glycols and glycol ethers to aid in fiber storage stability, biocides such as Amerstat 250 and Amerstat 251 (commercially available from Ashland Chemicals) and Nalco 9380 (commercially available from ONDEO), antifoaming agents such as Drew L-139 (commercially available from Drew Industries, a division of Ashland Chemical), antistatic agents such as Emerstat 6660A (commercially available from Cognis), dyes, oils, thermal stabilizers, anti-foaming agents, anti-oxidants, dust suppression agents, wetting agents, thickening agents, and/or other conventional additives. Additives may be present in the size composition from trace amounts (such as <about 0.1% by weight the total composition) up to about 5.0% by weight of the total composition.

The size composition may be made by adding the silane and deionized water in a container with agitation to hydrolyze the silane coupling agent. As described above, weak acids may be added to assist in hydrolyzing the silane coupling agent. After the hydrolyzation of the silane coupling agent, the film formers and lubricating surfactants, along with any desired additives, are added to form a mixture. If necessary, the pH of the mixture may be adjusted to a desired level. The film formers and lubricating surfactants (and any additives) may be added separately, or they may be added at the same time to form the main mixture.

The inventive sizing composition may be used to treat a reinforcing fiber. Any type of glass, such as A-type glass fibers, C-type glass fibers, E-type glass fibers, S-type glass fibers, ECR-type glass fibers (e.g., Advantex® glass fibers commercially available from Owens Corning), Hiper-tex™, wool glass fibers, or combinations thereof may be used as the reinforcing fiber. In at least one preferred embodiment, the glass fibers are wet use chopped strand glass fibers (WUCS). Wet use chopped strand glass fibers may be formed by conventional processes known in the art. It is desirable that the wet use chopped strand glass fibers have a moisture content from about 5 to about 30%, and even more desirably a moisture content from about 10 to about 20%.

WUCS fibers are a low cost reinforcement that provides impact resistance, dimensional stability, and improved mechanical properties such as improved strength and stiffness to the finished product. Further, with WUCS, the final product has the mechanical properties to take nails and screws in construction processes without cracking or other mechanical failures. In addition, WUCS fibers are easily mixed and may be fully dispersed or nearly fully dispersed in the white water of a wet-laid process.

Alternatively, the reinforcing fiber may be fibers of one or more synthetic polymers such as polyester, polyamide, aramid, and mixtures thereof. The polymer strands may be used alone as the reinforcing fiber material, or they can be used in combination with glass fibers such as those described above. As a further alternative, natural fibers may be used as the reinforcing fiber material. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include cotton, jute, bamboo, ramie, bagasse, hemp, coir, linen, kenaf, sisal, flax, henequen, and combinations thereof. Carbon or polyaramide fibers may be also used as the reinforcing fiber material. In preferred embodiments, all of the reinforcing fibers are glass fibers.

The inventive sizing composition may be applied to the reinforcing fibers with a Loss on Ignition (LOI) from 0.05 to 0.50% by weight on the dried fiber, and preferably from 0.1 to 0.3% by weight. This can be determined by the loss on ignition (LOI) of the reinforcing fibers, which is the reduction in weight experienced by the fibers after heating them to a temperature sufficient to burn or pyrolyze the organic size from the fibers. As used in conjunction with this application, LOI may be defined as the percentage of organic solid matter deposited on the reinforcement fiber surfaces.

The reinforcing fiber may include fibers that have a diameter from about 5.0 microns to about 30.0 microns and may be cut into segments having a discrete length of approximately 5.0 mm to about 50.0 mm in length. Preferably, the fibers have a diameter from about 10.0 microns to about 20.0 microns and a length from about 20 mm to about 35 mm. If the reinforcement fibers are WUCS, they may have a length of about ⅛ of an inch to about 2 inches and preferably a length from about ½ of an inch to about 1.5 inches. Each chopped strand may contain from approximately 500 fibers to approximately 8,000 fibers.

A non-woven chopped strand mat of the sized reinforcement fibers (e.g., a roofing mat) may be formed by a wet-laid process. Although any or a combination of the reinforcing fibers described herein may be used to form the chopped strand mat, it is to be noted that the exemplary process is described with respect to a preferred embodiment in which the reinforcement fibers are glass fibers. As is known in the art, glass fibers may be formed by attenuating streams of a molten glass material through a heated bushing to form substantially continuous glass fibers. As the fibers are drawn from the bushing, the inventive sizing composition is applied to the fibers. The size composition may be applied to the reinforcing fibers by any conventional method, including kiss roll, dip-draw, slide, or spray application to achieve the desired amount of the sizing composition on the fibers.

After the glass fibers are treated with the sizing composition, they are collected into a strand and chopped into discrete lengths as described above. It is also within the purview of the invention to chop the individual fibers into discrete lengths and feed the chopped fibers into the white water. Any suitable method or apparatus known to those of ordinary skill for chopping glass fiber strands into segments, such as a cutter/cot combination, may be used to chop or cut the strands. The specific number of individual fibers present in the chopped strands will vary depending on the particular application of the chopped strand mat and the desired strength and thickness of the mat. The wet, chopped glass fiber strands are collected in a container.

The chopped glass strands may be placed into a mixing tank that contains various surfactants, viscosity modifiers, defoaming agents, and/or other chemical agents (i.e., white water) with agitation to form a chopped glass fiber slurry. The white water may be passed through a machine chest and a constant level chest to further disperse the glass fibers. The chopped glass fiber slurry may then be transferred from the constant level chest to a head box where the slurry is deposited onto a moving screen or foraminous conveyor and a substantial portion of the water from the slurry is removed to form a web of enmeshed fibers. The water may be removed from the web by a conventional vacuum or air suction system. A binder is then applied to the web by a suitable binder applicator, such as a curtain coater. The binder-coated web is then passed through one or more drying ovens to remove any remaining water and cure the binder and form a chopped strand mat. The formed non-woven, chopped strand mat is an assembly of randomly oriented, dispersed, individual glass fibers.

The binder may be an acrylic binder, a styrene acrylonitrile binder, a styrene butadiene rubber binder, a urea formaldehyde binder, a polyacrylic binder, a urea-melamine binder, or mixtures thereof. A thermosetting urea formaldehyde binder is generally the most preferred binder due to its low cost. The urea formaldehyde binder may be modified with a styrene-butadiene rubber latex, an acrylic emulsion, or a styrene/acrylic emulsion to adjust the adhesion and mechanical properties of the binder. Non-exclusive examples of suitable urea formaldehyde resins include Casco-Resin FG-472X (available commercially by Hexion), GP-2928 and GP-2981 (available commercially from Georgia Pacific), and Dynea Prefere 2118-54 (available commercially from Dynea). Examples of acrylic emulsion binders include, but are not necessarily limited to, Rhoplex GL-618 and Rhoplex GL-720 (available commercially from Rohm & Haas) and Acronal DS 2396 (available commercially from BASF). A suitable example of a styrene-butadiene rubber latex includes 490NA from Dow Reichhold. The binder may optionally contain conventional additives for the improvement of process and product performance such as dyes, oils, fillers, colorants, UV stabilizers, coupling agents (e.g., aminosilanes), lubricants, wetting agents, surfactants, and/or antistatic agents.

In preferred embodiments, glass fibers are sized with the sizing composition and packaged as wet use chopped strand glass that are subsequently used to form reinforced building or roofing composites, such as shingles or built-up roofing. To form a shingle, a chopped strand mat such as is described in detail above is first formed. Asphalt is then applied to the dried/cured mat by any known manner, such as by passing the mat through a bath containing an asphalt mix that may include molten asphalt, fillers, and optionally sulfur to place a layer of asphalt on at least one side of the mat and fill in the interstices between the individual glass fibers. The asphalt-coated mat is then cut to the appropriate shape and size to form a shingle. The hot asphalt-coated mat may then be passed beneath one or more granule applicators which apply protective surface granules to portions of the asphalt-coated mat prior to cutting into the desired shape. It is to be appreciated that wet-laid mats formed with fibers sized with the inventive sizing composition may also be used for backing and flooring materials, or anywhere where good tensile strength is required.

Having generally described this invention, a further understanding can be obtained by reference to certain specific examples illustrated below which are provided for purposes of illustration only and are not intended to be all inclusive or limiting unless otherwise specified.

EXAMPLES

Example 1

Formation of Sizing Compositions

The sizing formulations set forth in Tables 2-3 were prepared in buckets as described generally below. To prepare the size compositions, approximately 90% of the water and, if present in the size composition, the acid(s) were added to a bucket. The silane coupling agents were added to the bucket and the mixture was agitated for a period of time to permit the silane to hydrolyze. After the hydrolyzation of the silanes, the lubricant and film former, together with the biocide and rheology modifier, were added to the mixture with agitation to form the size composition. The size composition was then diluted with the remaining water to achieve the target mix solids of approximately 1.07% mix solids.

TABLE 2

| Sizing A | | |
|---|---|---|
| Component | % by Weight of Total Composition | % Solids |
| Polyamide Resin | 13.50 | 20.00 |
| Silane Coupling Agent Package[a] | 11.26 | 16.30 |
| Lubricating Surfactants[b] | 74.55 | 23.80 |
| Rheology Modifier[c] | 0.68 | 25.50 |
| Biocide[d] | 0.01 | 1.50 |

[a] a combination of amino silanes and a ureido silane
[b] cationic polyamide lubricant and (ethylene oxide-propylene oxide) block copolymer
[c] polyacrylamide copolymer
[d] isothiazolin biocide

TABLE 3

| Component | Sizing B % by weight of total composition | % Solids |
|---|---|---|
| Polyamide Resin | 21.50 | 20.00 |
| Silane Coupling Agent Package[a] | 25.81 | 20.5 |
| Lubricating Surfactants[b] | 51.60 | 21.37 |
| Rheology Modifier[c] | 1.08 | 25.50 |
| Biocide[d] | 0.01 | 1.50 |

[a] a combination of an amino silane and a ureido silane
[b] cationic polyamide lubricant and (ethylene oxide-propylene oxide) block copolymer
[c] polyacrylamide copolymer
[d] isothiazolin biocide

Example 2

Non-Woven Mat Comparison

Each of the size compositions set forth in Tables 2 and 3 were applied to ECR-glass in a conventional manner (such as a roll-type applicator as described above). The ECR-glass was attenuated to 15.4 μm glass filaments. The glass fiber strands were then chopped with a mechanical cot/cutter combination to a length of approximately 1.375 inches and collected into a bucket. The chopped glass fibers contained approximately 17% forming moisture.

The wet chopped glass strands were then used to form two non-woven, chopped glass mats. The chopped fiber strands (each containing one of the size compositions set forth in Tables 2 and 3) were suspended in mixing tanks in which the appropriate additives (surfactants, dispersants, and the like) were added with agitation to form chopped glass fiber slurries. The glass slurries were each deposited onto a moving chain where a majority of the water was removed by a vacuum to form a web. A urea formaldehyde binder was applied to the glass webs by a weir (curtain coater). The webs were then passed through a forced air oven at 450° F. for approximately 1 minute (60 seconds) to remove the remaining water from the webs, cure the binder, and form the chopped glass mats.

The tensile strength in the machine direction and the tear strength in the cross-machine direction of the chopped strand mats formed from glass fibers sized with the inventive sizing compositions set forth in Table 2 (Inventive Sizing A) and Table 3 (Inventive Sizing B) were measured by an Instron machine (following the procedures set forth in ASTM D146) and by an Elmendorf tear testing apparatus respectively. A chopped strand mat formed of glass fibers sized with a commercially available polyvinyl alcohol-free sizing composition was also formed. The tensile strength in the machine direction and the tear strength in the cross-machine direction of the comparative mat were measured in the same manner as the inventive samples, and the results were compared to the chopped strand glass mats formed with the inventive size composition. The results are set forth in Table 4.

TABLE 4

| | Machine Direction Tensile Strength (lb/2 inch) | Cross-Machine Direction Tear Strength (grams) |
|---|---|---|
| Sizing on Fibers Forming the Non-Woven Mat | | |
| Commercial Sizing | 84.2 | 644 |
| Inventive Sizing A | 79.5 | 630 |
| Inventive Sizing B | 82.3 | 591 |
| % Comparison to Commercial Sizing | | |
| Inventive Sizing A | 94.4 | 97.8 |
| Inventive Sizing B | 97.7 | 91.8 |

As shown in Table 4, the chopped glass strand mats formed from fibers sized with the inventive sizing compositions retained up to 97.8% of the tear strength in the cross-machine direction and up to 97.7% of the tensile strength in the machine direction compared to a chopped strand glass mat formed with fibers sized with a commercial sizing that does not contain polyvinyl alcohol. These results are considered to be statistically significant. Thus, it can be concluded that fibers sized with the inventive size compositions retain both the tear and tensile strength compared to the comparative commercially available product.

Example 3

Shinglet Comparison

The chopped strand mat samples of Example 2 were formed into shinglets on an asphalt coating mimic line. The shinglet samples were tested for tensile strength in the machine direction by an Instron machine (following the procedures set forth in ASTM D146) and the tear strength in the cross-machine direction was measured utilizing an Elmendorf tear testing apparatus. The results are set forth in Table 5.

TABLE 5

| | Machine Direction Tensile Strength (lb/2 inch) | Cross-Machine Direction Tear Strength (grams) |
|---|---|---|
| Sizing on Fibers Forming the Shinglets | | |
| Commercial Sizing | 220 | 1524 |
| Inventive Sizing A | 208 | 1685 |
| Inventive Sizing B | 224 | 1562 |
| % Comparison to Commercial Sizing | | |
| Inventive Sizing A | 94.5 | 110.6 |
| Inventive Sizing B | 101.8 | 102.5 |

As shown in Table 5, the shinglets formed using Inventive Sizing B demonstrated superior tensile strength in the machine direction and tear strength in the cross-machine direction compared to shinglets formed from the commercially available fibers sized with a polyvinyl alcohol-free size composition. The shinglets formed using Inventive Sizing A demonstrated an increase in the tear strength in the cross-machine direction and a nearly equivalent performance of the tensile strength in the machine direction. Thus, it is believed that shingles formed from chopped strand mats formed utilizing the inventive sizing compositions would have improved long term performance.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A sizing composition for application to reinforcement fibers used to form wet-laid chopped strand mats, said sizing composition comprising:
   at least one film forming agent selected from the group consisting of polyamide resin, polyacrylamides, polyacrylamide copolymers, and combinations thereof, said at least one film forming agent being present in said composition in an amount from about 5% to about 30% by weight of the total composition;
   a silane coupling agent package including an amino silane and a ureido silane; and
   one or more lubricating surfactants, said one or more lubricating surfactants being present in said composition in an amount from about 40% to about 80% by weight of the total composition.

2. The sizing composition of claim 1, wherein said one or more lubricating surfactants is selected from the group consisting of an ethylene oxide/propylene oxide block polymer, stearic ethanolamide, polyethylene glycol esters, ethoxylated castor oil esters, aliphatic monoamines, aromatic diamines, amine ethoxylates and cationic fatty amides.

3. The sizing composition of claim 1, wherein said amino silane contains one or more aromatic amines.

4. The sizing composition of claim 3, wherein said film forming agent is a polyamide resin.

5. The sizing composition of claim 1, further comprising one or more members selected from the group consisting of rheology modifiers, biocides fillers, coalescents, antistatic agents, dyes, oils, thermal stabilizers, anti-foaming agents, anti-oxidants, dust suppression agents, wetting agents and thickening agents.

6. The sizing composition of claim 1, wherein said sizing composition is free of polyvinyl alcohol.

7. The sizing composition of claim 1, wherein:
   said at least one film forming agent is present in said sizing composition in an amount from about 10 to about 20% by weight of the total sizing composition;
   said silane coupling agent package is present in said sizing composition in an amount from about 10 to about 30 by weight of solids in the total sizing composition; and
   said one or more lubricating surfactants is present in said sizing composition in an amount from about 50 to about 75% by weight of the total sizing composition.

8. The sizing composition of claim 1, wherein said reinforcement fibers are wet use chopped strand glass fibers.

9. A sizing composition for application to reinforcement fibers used to form wet-laid chopped strand mats, said sizing composition comprising:
   at least one film forming agent selected from polyamide resin, polyacrylamides, polyacrylamide copolymers, and combinations thereof, said at least one film forming agent being present in said composition in an amount from about 5% to about 30% by weight of the total composition;
   a silane coupling agent package including an amino silane and a ureido silane; and
   two lubricating surfactants, said lubricating surfactants being present in said composition in an amount from about 40% to about 80% by weight of the total composition.

10. The sizing composition of claim 9, wherein said sizing composition is free of polyvinyl alcohol.

11. The sizing composition of claim 10, wherein said amino silane contains one or more aromatic amines.

12. The sizing composition of claim 10, wherein said lubricating surfactants are selected from the group consisting of an ethylene oxide/propylene oxide block polymer, stearic ethanolamide, polyethylene glycol esters, ethoxylated castor oil esters, aliphatic monoamines, aromatic diamines, amine ethoxylates and cationic fatty amides.

13. The sizing composition of claim 9, wherein said amino silane contains one or more aromatic amines.

14. The sizing composition of claim 9, wherein:
   said at least one film forming agent is present in said composition in an amount from about 10% to about 20% by weight of the total composition;
   said silane coupling agent package is present in said composition in an amount from about 10% to about 30% by weight of solids in the total composition; and
   said two lubricating surfactants are present in a total amount in said composition from about 50% to about 75% by weight of the total composition.

15. The sizing composition of claim 14, further comprising one or more members selected from the group consisting of rheology modifiers, biocides fillers, coalescents, antistatic agents, dyes, oils, thermal stabilizers, anti-foaming agents, anti-oxidants, dust suppression agents, wetting agents and thickening agents.

16. The sizing composition of claim 15, wherein said film forming agent is a polyamide resin.

17. The sizing composition of claim 9, wherein said reinforcement fibers are wet use chopped strand glass fibers.

18. A sizing composition for application to reinforcement fibers used to form wet-laid chopped strand mats, said sizing composition comprising:
   at least one film forming agent selected from the group consisting of polyvinyl amines, polyvinyl amine copolymers, polyamides, polyacrylamides, polyacrylamide copolymers, and combinations thereof, said at least one film forming agent being present in said composition in an amount from about 5% to about 30% by weight of the total composition;
   a silane coupling agent package including an amino silane and a ureido silane, said silane coupling agent package being present in said composition in an amount from about 10% to about 30% by weight of the solids in the total composition; and
   one or more lubricating surfactants, said one or more lubricating surfactants being present in said composition in an amount from about 40% to about 80% by weight of the total composition.

* * * * *